(12) United States Patent
Kayhan et al.

(10) Patent No.: US 10,693,702 B2
(45) Date of Patent: Jun. 23, 2020

(54) DATA TRANSMISSION METHOD AND DEVICE USING NON-UNIFORM APSK CONSTELLATIONS

(71) Applicant: UNIVERSITÉ DU LUXEMBOURG, Luxembourg (LU)

(72) Inventors: Farbod Kayhan, Luxembourg (LU); Bjorn Ottersten, Luxembourg (LU); Bhavani Shankar Mysore Rama Rao, Luxembourg (LU)

(73) Assignee: UNIVERSITÉ DU LUXEMBOURG, Esch-sur-Alzette (LU)

( * ) Notice: Subject to any disclaimer, the term of this patent is extended or adjusted under 35 U.S.C. 154(b) by 0 days.

(21) Appl. No.: 16/303,988

(22) PCT Filed: May 23, 2017

(86) PCT No.: PCT/EP2017/062369
§ 371 (c)(1),
(2) Date: Nov. 21, 2018

(87) PCT Pub. No.: WO2017/202823
PCT Pub. Date: Nov. 30, 2017

(65) Prior Publication Data
US 2019/0268210 A1 Aug. 29, 2019

(30) Foreign Application Priority Data
May 24, 2016 (LU) .......................................... 3085

(51) Int. Cl.
*H04L 27/34* (2006.01)

(52) U.S. Cl.
CPC ...... *H04L 27/3433* (2013.01); *H04L 27/3405* (2013.01); *H04L 27/3477* (2013.01)

(58) Field of Classification Search
CPC ........................ H04L 27/3433; H04L 27/3477
See application file for complete search history.

(56) References Cited

U.S. PATENT DOCUMENTS

| 4,327,439 A * | 4/1982 | Gockler | H04L 27/0008 332/145 |
| 9,900,105 B1 * | 2/2018 | Batshon | H04B 10/541 |
| 2016/0056989 A1 * | 2/2016 | Murakami | H04L 27/34 375/298 |

OTHER PUBLICATIONS

R1-1703377, Reduced PAPR APSK Constellations, Hughes Network Systems, 3GPP TSG RAN WG1 Meeting #88; Athens, Greece, Feb. 13-17, 2017 (Year: 2017).*
Keqian Van et al., Non-Uniform APSK Optimization for BICM Systems, Tsinghua Science and Technology, Apr. 2015, 20(2): 175-181 (Year: 2015).*
Meric, H., "Approaching the Gaussian channel capacity with APSK constellations," IEEE Communications Letters, vol. 19, No. 7, May 11, 2015, pp. 1125-1128, XP055335517.
(Continued)

*Primary Examiner* — Nader Bolourchi
(74) *Attorney, Agent, or Firm* — Lando & Anastasi, LLP

(57) ABSTRACT

A simple construction for a family of non-uniform APSK constellations by the radial isomorphism between squares to circles is provided. The mutual information values indicate gains of at least 0.5 dB up to 1.5 dB with respect to the state of the art, such as the DVB-S2X constellations with 256 symbols. The invention also provides for a low-complexity detector of high-order modulated signals.

15 Claims, 4 Drawing Sheets

(56) References Cited

OTHER PUBLICATIONS

Anedda Matteo et al., "64 APSK Costellation Mapping Optimization for Satellite Broadcasting using Genetic Algorithms," IEEE Transactions on Broadcasting, vol. 62, No. 1, Mar. 1, 2016, pp. 1-9, XP011608404.

\* cited by examiner

DATA TRANSMISSION METHOD AND DEVICE USING NON-UNIFORM APSK CONSTELLATIONS

CROSS-REFERENCE TO RELATED APPLICATIONS

This application is a U.S. National Phase Application under 35 U.S.C. § 371 of International Application No. PCT/EP2017/062369 filed May 23, 2017, which claims priority to Luxembourg Application No. 93085 filed May 24, 2016.

TECHNICAL FIELD

The present invention lies in the field of digital communications.

BACKGROUND OF THE INVENTION

In digital communication systems, data is encoded into signals using a digital modulation technique before being transmitted using a communication channel. A digital modulation scheme is typically defined by a signal constellation in a complex plane or in a higher dimensional space, wherein each signal point of the constellation corresponds to a data symbol. Once a receiver demodulates the received signal, the transmitted constellation point may be retrieved using the received signal, based on the signal constellation's geometry.

In view of the growing demand for spectral efficiency in digital communications, high order modulation design has received a considerable attention in the recent past. To cater to this demand, modulation and coding, MODCOD, configurations employing constellations of orders 128 and 256 were adopted in the new digital video broadcasting standard (DVBS2X), see ETSI 302-307-2, "Digital Video Broadcasting (DVB) Part II: DVBS2-Extensions (DVB-S2X))", 2014. Such high order constellations are also under considerations by consultative committee for space data systems, CCSDS, for future standards. Given the fact that the traffic demand for satellite broadband is expected to grow six-fold by 2020, and the continuous need for higher data rates in satellite communications, even larger constellations may be needed in near future.

A distinctive property of satellite communication systems, is the non-linear characteristics of high power amplifier, HPA, on-board of the satellite. Hence, the conventional additive white Gaussian noise, AWGN, channel with average power limitation is no longer an accurate model and nonlinear characteristics have to be taken into account. This usually leads to assume a peak power limited signaling due to the HPA operating near the saturation limits. Under the peak power constraint, the capacity achieving input signal distribution is known to be discrete in amplitude (having finite number of mass points) with a uniformly distributed phase. Even though the optimal distribution for a finite set is not known in general, several previous studies indicate that amplitude and phase-shift keying (APSK) modulations perform very close to the capacity, see for example Kayhan et al, "Joint signal-labeling optimization under peak power constraint," Int. J. of Satellite Communications and Network, DOI: 10.1002/sat.1016, 2012. Recently, it has been shown that asymptotically, APSK constellations can also achieve the Gaussian capacity, see H. Meric, "Approaching the Gaussian Channel Capacity With APSK Constellations," in IEEE Communications Letters, vol. 19, no. 7, pp. 1125-1128, July 2015.

Optimizing the APSK signal constellation has been studied by several authors in the literature. The number of points on each circle, the radii and phases of each concentric circle of APSK constellations need to be optimized in order to achieve near capacity performances. Even though for constellations with up to 64 points, the number of possibilities is rather limited and therefore the optimization problem can be still handled, for larger constellations the problem becomes complex and the proposed algorithms in the literature usually fail to provide a good sub-optimal solution.

Another problem which arises regarding the optimization of APSK constellation is the bit to symbol mapping. This problem becomes particularly important in the pragmatic systems, where no iteration between the detector and the decoder is allowed.

Following this observation, several algorithms have been proposed in the literature for constellation design without imposing any particular structure. Recently, a simulated annealing algorithm has been implemented to maximize the average mutual information, AMI, or the pragmatic average mutual information, PAMI, (also known as the bit-interleaved coded modulation (BICM) capacity). When AMI and PAMI can be computed with a good approximation, they provide a reliable metric to assess the performance of the optimized constellation set. When the objective function is PAMI, the joint signal and labeling optimization is needed to secure a good result.

Simulated annealing, see for example Kirkpatrick et al., "Optimization by simulated annealing," Science, vol. 220, pp. 671-680, May 1983, becomes inefficient for constellations larger than 64. For larger constellations, however, the simulated annealing becomes extremely slow and may converge to a local maximum which is only slightly better than the initializing constellation.

Anedda et. al disclose an APSK signal constellation for modulating data into signal constellation symbols in "64-APSK Constellation and Mapping Optimization for Satellite Broadcasting Using Genetic Algorithms", IEEE Transactions on Broadcasting, vol. 62, no. 1, 1 Mar. 2016, pages 1-9.

Technical Problem to be Solved

It is an objective to present a method and device, which overcome at least some of the disadvantages of the prior art.

SUMMARY OF THE INVENTION

According to a first aspect of the invention, a method for transmitting and receiving a digital data stream over a communication channel is provided. The method comprises the following steps:
a) at a transmitting node, modulating the digital data stream using modulation means onto a carrier wave to generate a modulated signal, the modulation means converting digital data in the data stream into symbols for transmission by transmission means, the symbols being encoded into one of M possible symbols of a first M-ary signal constellation, the symbols of said first signal constellation being distributed on a plurality of C concentric circles
b) at the transmitting node, transmitting the modulated signal over said communication channel using transmission means;
c) at a receiving node, receiving said modulated signal using receiving means;

d) at the receiving node, detecting each symbol of said received modulated signal using detection means.

The method is further remarkable in that:
said first M-ary signal constellation is associated with a corresponding second M-ary quadrature amplitude modulation, QAM, signal constellation having an equal plurality of C concentric squares, wherein a symbol on a given circle of the first signal constellation bijectively maps to a symbol of a corresponding QAM square, and wherein said step of detecting said symbols comprises the step of
i) detecting each symbol in the modulated signal using the characteristics of the second QAM signal constellation.

The modulating means may preferably comprise a data processor which is configured for reading the configuration of signal constellation, pre-stored in a memory element to which it has read access, from said memory element, and to perform mathematical operations for generating said modulated signal, starting from said digital data stream.

The transmission means may preferably comprise a wired or wireless networking interface, operatively connected to said data processor and configured for putting said modulated signal onto said communication channel.

The detection means may preferably comprise a wired or wireless networking interface operatively connected to a data processor, configured for receiving said modulated signal on said communication channel and for forwarding the signal to the data processor. The data processor may further preferably be configured to storing said received signal in a memory element, and for detecting, using mathematical, data symbols in said received signal.

According to another aspect of the invention, said first M-ary signal constellation is preferably such that there exists a corresponding second M-ary quadrature amplitude modulation, QAM, signal constellation having an equal plurality of C concentric squares, wherein a symbol on a given circle of the first signal constellation bijectively maps to a symbol of a corresponding QAM square, and wherein According to another aspect of the invention, a method for transmitting a digital data stream over a digital communication channel at a transmitting node is provided. The method comprises the following steps:
modulating the digital data stream using modulation means onto a carrier wave to generate a modulated signal, the modulation means converting data in the data stream into symbols for transmission by transmission means, the symbols being encoded into one of M possible symbols of a first M-ary signal constellation, the symbols of said first signal constellation being distributed on a plurality of C concentric circles; and
transmitting the modulated signal over said communication channel using transmission means.

The method is characterized in that said first M-ary signal constellation is associated with a corresponding second M-ary quadrature amplitude modulation, QAM, signal constellation having an equal plurality of C concentric squares, wherein a symbol on a given circle of the first signal constellation bijectively maps to a symbol of a corresponding QAM square.

According to yet another aspect of the invention, said first M-ary signal constellation is such that there exists a corresponding second M-ary quadrature amplitude modulation, QAM, signal constellation having an equal plurality of C concentric squares, each square being circumscribed by a corresponding circle of the first M-ary signal constellation, wherein the first symbols on a given circle of the first signal constellation bijectively map to the second symbols of a corresponding QAM square, the mapping being such that for each of said second symbols of a QAM square, a radius of said corresponding circle passes through said second symbol and its corresponding first symbol.

According to another aspect of the invention, a method for receiving a digital data stream over a communication channel at a receiving node is provided. The method comprises the following steps:
receiving a modulated signal using receiving means, wherein said signal has been modulated at a transmitting node using a first M-ary signal constellation, the symbols of said first signal constellation being distributed on a plurality of C concentric circles;
detecting each symbol of said received modulated signal using detection means.

The method is characterized in that said first M-ary signal constellation is associated with a corresponding second M-ary quadrature amplitude modulation, QAM, signal constellation having an equal plurality of C concentric squares, wherein a symbol on a given circle of the first signal constellation bijectively maps to a symbol of a corresponding QAM square, and wherein said step of detecting said symbols comprises the additional step of:
i) detecting each symbol in the modulated signal using the characteristics of the second QAM signal constellation.

According to a further aspect of the invention, said first M-ary signal constellation is such that there exists a corresponding second M-ary quadrature amplitude modulation, QAM, signal constellation having an equal plurality of C concentric squares, wherein a symbol on a given circle of the first signal constellation bijectively maps to a symbol of a corresponding QAM square.

Prior to step (i) the method may preferably comprise the step of using the inverse of said bijective map for mapping the received signal, which has been modulated using said first signal constellation, to the corresponding QAM-modulated signal, and wherein at step (i), each symbol is detected in the corresponding QAM-modulated signal.

Preferably, in said first M-ary signal constellation, the number of symbols on concentric circles may form an arithmetic progression with common difference 8 and starting point 4 on the smallest circle, for $M=2^m$ and m even, and in particular for m=6 or m=8, the latter being a 256-ary APSK signal constellation.

Said M-ary first signal constellation may preferably be a 4+12+20+28+32+32-APSK constellation for $M=2^m$ and m=7; and a 4+12+20+28+36+44+52+60+64+64+64+64-APSK constellation for m=9.

Preferably, a circle of said first signal constellation may be the smallest covering circle covering the symbols located on the corresponding square of the QAM constellation onto which the first signal constellation symbols bijectively map.

Said bijective mapping between the first and second signal constellations may preferably preserve the relative distances between any two symbols in the first signal constellation.

Said first signal constellation may preferably be a uniform APSK constellation, any two neighboring symbols on a given concentric circle having substantially equal phase difference. Preferably, the phase differences may be equal.

Preferably, said first signal constellation may be a non-uniform APSK constellation.

The difference of the radii of any two neighboring concentric circles of said first signal constellation may preferably be substantially equal. Preferably, they may be equal.

Preferably, the difference of the radii of two neighboring concentric circles of said first signal constellation may depend on the two circles.

Said first signal constellation and said second QAM constellation may preferably have a dimensionality that is higher than 2.

According to a further aspect of the invention, a data transmission device comprising modulation means, transmission means and at least one memory element is provided. The device is configured for modulating the digital data stream using modulation means onto a carrier wave to generate a modulated signal, the modulation means converting digital data in the data stream into symbols for transmission by the transmission means, the symbols being encoded into one of M possible symbols of a M-ary signal constellation, the symbols of said first signal constellation being distributed on a plurality of C concentric circles transmitting the modulated signal over a communication channel using transmission means.

Said first signal constellation is associated with a corresponding second M-ary quadrature amplitude modulation, QAM, signal constellation having an equal plurality of C concentric squares, wherein a symbol on a given circle of the first signal constellation bijectively maps to a symbol of a corresponding QAM square According to another aspect of the invention, said first signal constellation is such that there exists a corresponding second M-ary quadrature amplitude modulation, QAM, signal constellation having an equal plurality of C concentric squares, each square being circumscribed by a corresponding circle of the first M-ary signal constellation, wherein the first symbols on a given circle of the first signal constellation bijectively map to the second symbols of a corresponding QAM square, the mapping being such that for each of said second symbols of a QAM square, a radius of said corresponding circle passes through said second symbol and its corresponding first symbol.

The device may further be configured for carrying out the method steps in accordance with the invention.

According to another aspect of the invention, there is provided a data reception device comprising receiving means, detection means, and at least one memory element. The device is configured for:

receiving said modulated signal using the receiving means, wherein said signal has been modulated at a transmitting node using a first M-ary signal constellation, the symbols of said first signal constellation being distributed on a plurality of C concentric circles;

detecting each symbol of said received modulated signal using detection means.

Said first M-ary signal constellation is associated with a corresponding second M-ary quadrature amplitude modulation, QAM, signal constellation having an equal plurality of C concentric squares, wherein a symbol on a given circle of the first signal constellation bijectively maps to a symbol of a corresponding QAM square. The detection means are further configured for i) detecting each symbol in the modulated signal using the characteristics of the second QAM signal constellation.

In accordance with yet another aspect of the invention, said first M-ary signal constellation is such that there exists a corresponding second M-ary quadrature amplitude modulation, QAM, signal constellation having an equal plurality of C concentric squares, wherein a symbol on a given circle of the first signal constellation bijectively maps to a symbol of a corresponding QAM square.

The device may further be configured for carrying out the method steps in accordance with the invention.

According to a further aspect of the invention, there is provided a computer program comprising computer readable code means, which when run on a computer, causes the computer to carry out at least method steps (a) and (b), or (c) and (d) according to the invention.

There is further provided a computer program comprising computer readable code means, which when run on data processing means, causes the data processing means to carry out the method according to the invention.

According to yet another aspect of the invention, a computer program product comprising a computer-readable medium on which the computer program according to the invention is stored is provided.

Finally, there is provided a data processing means configured for carrying out the method according to the invention.

In principle, the invention can be employed in any digital communication system which modulates digital data into constellation points prior to communication. The high impact domain pertains to the high throughput satellite communication systems which offer simplex and duplex services including TV broadcasting and broadband internet. Applications in mobile communication systems as well as DSL/cable technology are also foreseen. Key to the design and implementation of digital communication systems include their ability to convey large amounts of data with the given resources and having a low complexity of implementation, especially of those devices which are used by customers. The proposed invention aims to achieve these targets.

In accordance with embodiments of the present invention, construction for non-uniform APSK constellations, based on the radial mapping between squares and circles is provided. The obtained constellations are then the image of M-QAM under this mapping. These constellations are referred to as QAM to circular isomorphic, QCI, constellations. The points of the proposed constellations lie on concentric circles. Further, optimization of such constellations, based on radii optimization or equivalently, one dimensional optimization is also provided. Inspired by the structure, a new family of APSK constellations is provided. The generalization is immediate to higher dimensional constellations. The invention provides a systematic way to generate a family of high order constellations in multiple dimensions.

The transformation from M-QAM to M-QCI is an isomorphism and therefore the inverse mapping exists and retransforms the M-QCI constellation to the M-QAM constellation. Such an inverse mapping can be used at the receiver in order to use a one-dimensional detector (quadrature and in-phase detection), reducing substantially the detection complexity for such constellations.

The proposed signal constellations allow for a natural Gray labelling obtained by the QAM labelling through the radial isomorphism. Gains larger than 0.5 dB with respect to the state of the art constellations, in terms of average mutual information and pragmatic average mutual information can be observed compared to state of the art methods. Moreover, the computational complexity of the detector is a polynomial function of the number of constellation points. The proposed constellation differs from the other constellations known in the art in one or more of the following aspects:

1. Number of concentric circles
2. Number of points over the concentric circles
3. The phase distribution of points over each and/or all concentric circles 4. The radii distribution of the concentric circles
5. Being an image of a QAM constellations through an isomorphism
6. Allowing for a low complexity detection algorithm through quadrature and in-phase separation
7. Allowing for a Gray mapping from bits to the constellation points
8. The number of dimensions of the signal space can be more than 2.
9. Efficient optimization of the APSK constellation as a function of the channel model.

Moreover, the invention provides a communication system, where the coded and/or uncoded bits are mapped to the QCI constellation. And at the receiver, the received signal is first transformed by the inverse isomorphism and then quadrature and in-phase detection is employed in order to reduce the detection complexity.

Finally, the invention provides M-ary APSK constellations, or equivalently QCI constellations, $M=2^m$ with m being odd or even. Form even and m>3, the number of points on concentric circles advantageously form an arithmetic progression with common difference 8 and starting point 4. As for example: 4+12+20+28+36+44+52+60-APSK. According to this notation, the innermost circle comprises 4 points, the circle with the second smallest radius comprises 12 points, and so on. The outermost circle comprises 60 points. Any radii distribution and labelling may be used, in particular the Gray mappings.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

This section describes the invention in further detail based on preferred embodiments and on the figures.

Figure 1:
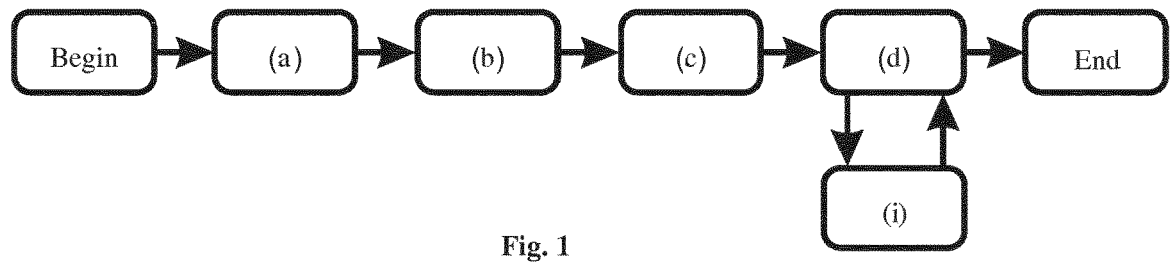
FIG. 1 illustrates the main steps according to a preferred embodiment of the method according to the invention.

FIG. 1 shows the main steps according to a preferred embodiment of the method according to the present invention. In a communication network, a receiving node transmits data to at least one receiving node using a data communication channel. A non-limiting example of such a channel may be a wireless channel, for example a satellite link.

In a first step (a), the transmitting node modulates a digital data stream onto a carrier wave to generate a modulated signal. The data is converted into symbols that are transmitted. Each symbol is preferably one of M possible symbols of a first M-ary signal constellation. The first signal constellation may be an amplitude-and-phase-shift keyed, APSK signal constellation. The APSK constellation may be uniform with respect to the phase distribution among symbols, or non-uniform. The symbols of the constellation are distributed on a plurality of C concentric circles. Signal spaces of higher dimensions may also be considered. The concepts described herein extend straightforwardly to such signal spaces. The number of symbols per circle, the distribution of symbols on a given circle, the number of circles as well as their radii may vary in light of a performance metric that is to be achieved by the transmitter. Different performance metrics known in the art may be used to optimize the specific distribution of symbols among and on the C concentric circles of the first signal constellation. The APSK constellation is associated with a corresponding M-ary quadrature amplitude modulation, QAM, signal constellation having an equal plurality of C concentric squares, wherein a symbol on a given APSK circle bijectively maps to a symbol of a corresponding QAM square. Each APSK symbol is uniquely mapped to one QAM symbol. The mapping between both constellations is such that relative distances between symbols are preserved in either constellation. In particular, symbols that are closest signal space neighbors in one (for example APSK) constellation are also closest neighbors in the associated (for example QAM) mapped constellation.

At a following step (b), the modulated carrier wave or signal transmits the symbols over the communication channel that links the transmitting node to the receiving node.

The receiving node receives the modulated signal, which is generally contaminated by noise. This happens at step (c). Finally, during step (d), the receiving node detects the symbols that have been mapped onto the carrier wave at the transmitting node. In order to do so, the receiver may proceed with step (i). At step (i), the receiver proceeds with detecting the transmitted symbols using the corresponding QAM-constellation, rather than using the APSK signal constellation that was used for modulating the signal at the transmitter. As detecting the QAM symbols involves only low-complexity computations, the method allows for a low-complexity detector of received APSK-modulated signals, by using the characteristics of said mapping. The detected QAM symbols may finally be mapped back to the corresponding symbols of the first signal constellation. Preferably, prior to step (i), the method may include a step of using the inverse of said bijective mapping to map the received signal, which has been modulated using said first signal constellation (typically APSK), to the corresponding QAM-modulated signal. The detection is then performed explicitly on the QAM-modulated signal, which is preferably stored in a memory element.

It should be noted that the method may comprise further data coding/decoding steps at the transmitting and receiving nodes respectively, as it is well known in the art.

Figure 2:
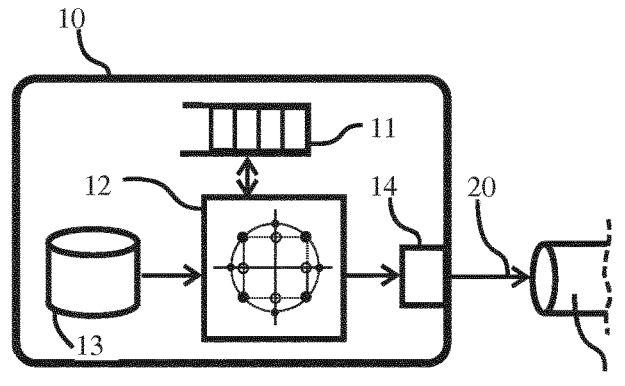
FIG. 2 is a schematic illustration of a data transmission device according to a preferred embodiment of the invention.

FIG. 2 schematically illustrates an exemplary device for implementing the above outlined steps (a) and (b). The data transmission device 10 comprises a memory element 11, which may be a volatile memory for storing the data that is to be transmitted, a consistent memory element 13 in which the described signal constellation and/or mapping is stored, and modulation means 12 for modulating the data onto a carrier wave in accordance with the first signal constellation. While the consistent memory element 13 is shown to be physically collocated with the device 10, it may as well be remote to the device. In such a case, the device 10 has remote access to the networked memory resource 13 using a communication channel. The resulting modulated signal 20 is transmitted using transmission means 14 over a communication channel 30.

Figure 3:
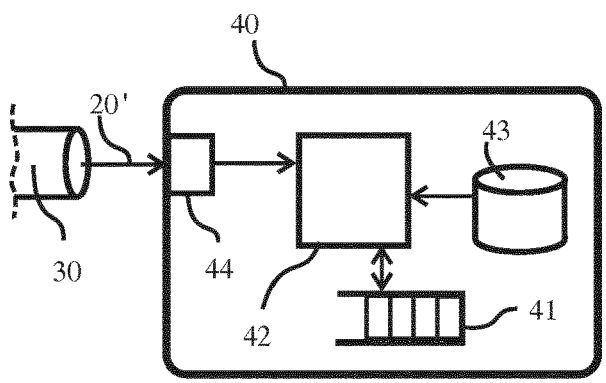
FIG. 3 is a schematic illustration of a data reception device according to a preferred embodiment of the invention.

FIG. 3 schematically illustrates an exemplary device for implementing the above outlined steps (c) and (d). The data reception device 40 comprises a memory element 41, which may be a volatile memory for storing the data that is received, a consistent memory element 43 in which the described signal constellation and/or mapping is stored, and detection or demodulation means 42 for demodulating the carrier wave. The signal 20', which has been modulated using the first signal constellation, typically an APSK constellation, is received using data receiving means 44. The signal 20' is typically a noisy representation of signal 20 as shown in FIG. 2. The detection means proceed with mapping the received signal 20' to the corresponding QAM-modulated signal, and then detecting the corresponding QAM symbols.

In what follows, a particularly preferred embodiment in accordance with the invention is described.

I. Introduction

In the following, focus is given on the application of two-dimensional constellation design in the particular scenario involving satellite communications. However, the application of the constellation design can be used in other systems like mobile communications, backhauling, optical etc. Further multidimensional constellation designs can be considered for the aforementioned applications when more than one resource is used (polarization, multiple antennas etc.)

While the focus of the present embodiment is PAMI with peak power constraints, other objectives and constraints (like average power) can also be considered without departing from the scope of the present invention.

A simple construction for non-uniform APSK constellations is provided, based on the radial map between squares and circles. The obtained constellations are then the image of MQAM. We refer to these constellations as QAM to circular isomorphic, QCI, constellations. The main goal is to provide a family of peak power limited constellations which can serve as a competitive benchmark for future high order constellation design. As will be shown in what follows, the proposed constellations (without any further optimization) may provide even more than 1.5 dB gain with respect to the constellations employed in DVB-S2X. These results should also highlight the importance of having such a testing benchmark in future standardization.

Besides serving as a benchmark, the QCI constellations in accordance with the present invention actually provide the state-of-art performance for peak power limited channels. Several ways to improve and built upon the results presented in this embodiment will be discussed. Being the image of the QAM, the QCI constellations potentially allow for a very efficient one-dimensional (1D) soft-detection by inverse mapping to the QAM constellation. Notice that the results provided in the context of this embodiment can be applied in various digital communication systems, such as satellite, mobile, backhauling, etc. Moreover, the results can be extended to higher dimensional constellation spaces with alternative power constraints (e.g., average power or peak to average power ratio, PAPR).

The remainder of the description is organized as follows. In Section II the notations and the objective functions upon which the constellations are compared are introduced. The QCI construction in accordance with the invention is also explained in details. In Section III, the AMI and PAMI of QCI constellation are compared with those of DVB-S2X. Some of the characteristic properties of the construction in accordance with the invention are discussed in section IV and a system model based on QCI constellations with the low complexity detector is provided.

Section II. QAM to Circular Isomorphic Constellations

A constellation $\chi$ is a finite subset of the k dimensional Euclidean space, i.e., $\chi \subset R^k$. In this embodiment, the interest lies mainly with constellations with $M=2^m$ elements and $k=2$, even though the results can be easily generalized to the higher dimensions and non binary constellations without departing from the scope of the present invention. The elements of $\chi$ are referred to as constellation points or transmitted symbols.

Figure 4:
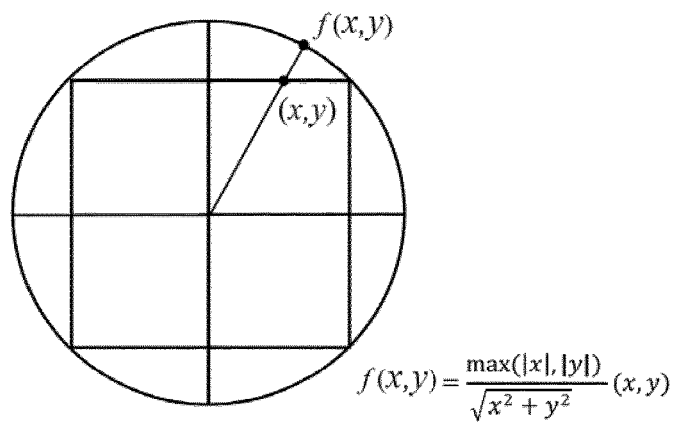
FIG. 4 provides an example of square-to-circle mapping, as it is used in accordance with a preferred embodiment of the method according to the invention.

The symbols are associated to the bits at the input of the modulator through the one-to-one labelling $\mu: \chi \rightarrow \{0,1\}^m$. For any given symbol x, denote by $\mu^i(x)$ the value of the $i^{th}$ bit of the label associated to it. It is well-known that the square and circle are isomorphic, i.e., there exists a continuous, one-to-one and onto map with the continuous inverse between them. We are interested in one of the simplest existing maps, i.e., the radial mapping or concentric mapping (see FIG. 4). This isomorphism maps the concentric squares into the concentric circles with the same diameter. Let $S=\{(x,y)|\,|x|\leq 1,|y|\leq 1\}$ and $C=\{(x,y)|x^2+y^2\leq 2\}$ denote the unit square and the disc with radius $\sqrt{2}$ respectively.

Then the radial map $f: S \rightarrow C$ can be written analytically as below:

$$f(x, y) = \begin{cases} \frac{\sqrt{2}\max(|x|, |y|)}{\sqrt{x^2 + y^2}}(x, y) & \text{if } (x, y) \neq (0, 0) \\ (0, 0) & \text{if } (x, y) = (0, 0). \end{cases}$$

Figure 5:
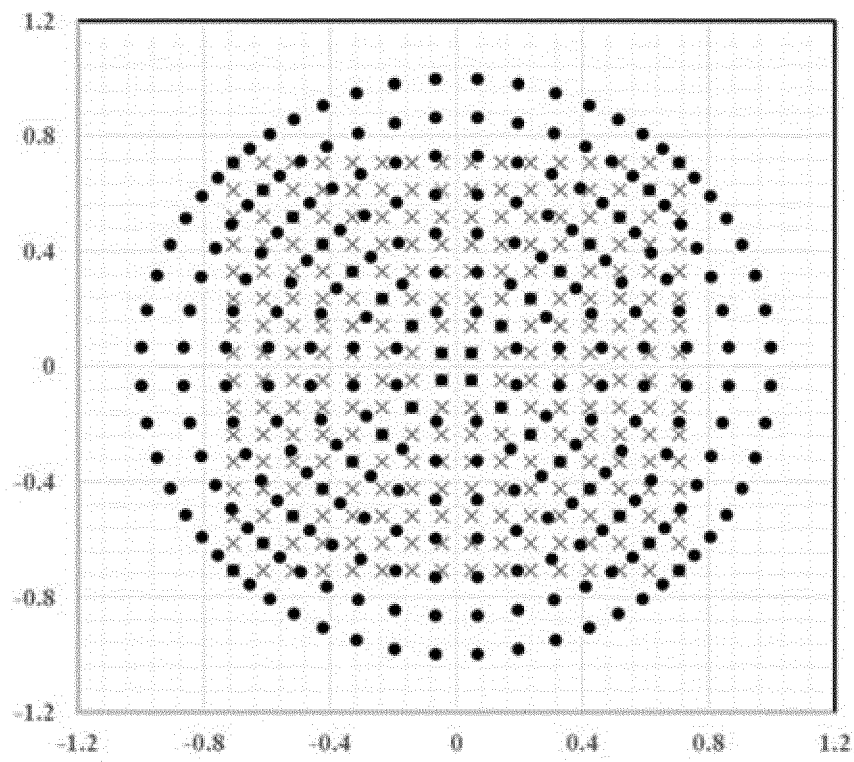
FIG. 5 illustrates a 256-ary signal constellation obtained by mapping a 256-QAM constellation to a non-uniform 256-APSK constellation.

In FIG. 5 the 256-QAM and the image of it under the radial isomorphism are plotted. The inverse mapping is noted by $f^{-1}$.

According to one example, the radial map can be described as follows. A square of a QAM signal constellation is circumscribed by a corresponding circle of the circular M-ary signal constellation. The first symbols on a given circle of the first signal constellation bijectively map to the second symbols of a corresponding QAM square, the mapping being such that for each of said second symbols of a QAM square, a radius of said corresponding circle passes through said second symbol and its corresponding first symbol. Conversely, starting from the resulting non-uniform circular constellation, one may describe the mapping as follows. Each symbol lying on a given circle corresponds to a QAM symbol of a quadratic QAM constellation having a square that is circumscribed by that circle. The corresponding QAM symbol is obtained by the intersection of the radius joining the symbol lying on the circle to the circle's center, with said square. It is further understood that the QAM constellation is preferably uniform, so that QAM symbols in each quadrant of the constellation are uniformly spaced in both the horizontal and vertical directions.

It is important to notice that the binary Gray mapping of QAM constellation will be preserved under f, and therefore the resulting QCI constellation also has a natural Gray mapping. Therefore, for each M-QAM constellation, a unique M-QCI constellation can be constructed.

It should be noted that the resulting exemplary M-QCI constellation is an APSK constellation with non-uniform phase distribution.

For even values of m, the M-QCI constellation has $2^{m/2-1}$ equidistant concentric rings. The number of points on each ring form a arithmetic progression starting from 4 and with common difference 8. For odd values of m, the resulting QCI constellation has essentially the same structure, except for the last few circles (outer rings).

A. Performance Metric

For the AWGN channel, the received signal can be written as y=x+n, where n has a Gaussian distribution. AMI and PAMI have been shown to be reliable metrics for measuring the constellation performance for the given channel, see for example Kayhan et al., "Joint signal-labeling optimization under peak power constraint," Int. J. of Satellite Communications and Network, DOI: 10.1002/sat.1016, 2012. Denote, respectively by $I(\chi)$ and $I_p(\chi,\mu)$ the AMI and PAMI of a given constellation $\chi$ and mapping $\mu$:

$$I(\chi) = \frac{1}{M}\sum_{x\in\chi} E_n\left\{\log\frac{P(y|x)}{P(y)}\right\} \quad (1)$$

$$I_p(\chi, \mu) = \sum_{i=1}^{m} I(\mu^i(x); y), \quad (2)$$

$$= \frac{1}{M}\sum_{i=1}^{m}\sum_{x\in\chi} E_n\left\{\log\frac{P(y|\mu^i(x))}{P(y)}\right\}$$

where $I(.,.)$ is the mutual information function and $E_n$ is the average with respect to the Gaussian noise.

Section III. Comparison with DVB-S2X

The DVB-S2X standard implements various constellations with 256 points (3 of which are APSK), but to the best of the author's knowledge, no justification about the constellation design has been provided in ETSI 302-307-2, "Digital Video Broadcasting (DVB) Part II: DVBS2-Extensions (DVB-S2X))", 2014. In this section the AMI and PAMI of the 256-QCI are compared with the DVB-S2X constellations.

As mentioned, interest lies in the peak-power limited design and therefore in what follows the maximum power of a constellations is always fixed to be 1, i.e., ., $|x|^2 \le 1$ for all $x\in\chi$.

In such cases, instead of the signal to noise ratio, the peak power to noise ratio, PSNR, should be considered as a measure for comparing two constellations. Notice that PSNR is the ratio between the peak power of the constellation and the noise power spectral density:

$$PSNR \triangleq \frac{1}{N_0} \ge SNR \triangleq \frac{1}{M}\sum_{x\in\chi}\frac{|x|^2}{N_0}.$$

Assuming a memory less ideal non-linearity model (soft limiter) for the HPA and ignoring the effect of filters, the PSNR coincides with $P_{sat}/N_0$:

$$SNR = \frac{E_s}{N_0} = \frac{P_{sat}}{N_0} \cdot \frac{E_s}{P_{sat}} = PSNR - OBO[\text{dB}].$$

Six MODCODs in DVB-S2X use constellations with 256 points. However, two of the MODCODs use the same constellation, and therefore, only five different constellations with 256 points exist in DVB-S2X standard. These five constellations can be distinguished by the rate of the codes that they are coupled with. For example, the constellation used with the LDPC code of rate 135/180 may be denoted by "DVBS2X 135/180". Three of the constellations are APSK with 8 concentric circles each having 32 points. The "DVBS2X 20/30" and "DVBS2X 22/30" have somehow irregular shapes and are probably obtained by initializing an optimization algorithm with a APSK structure mentioned above.

Figure 6:
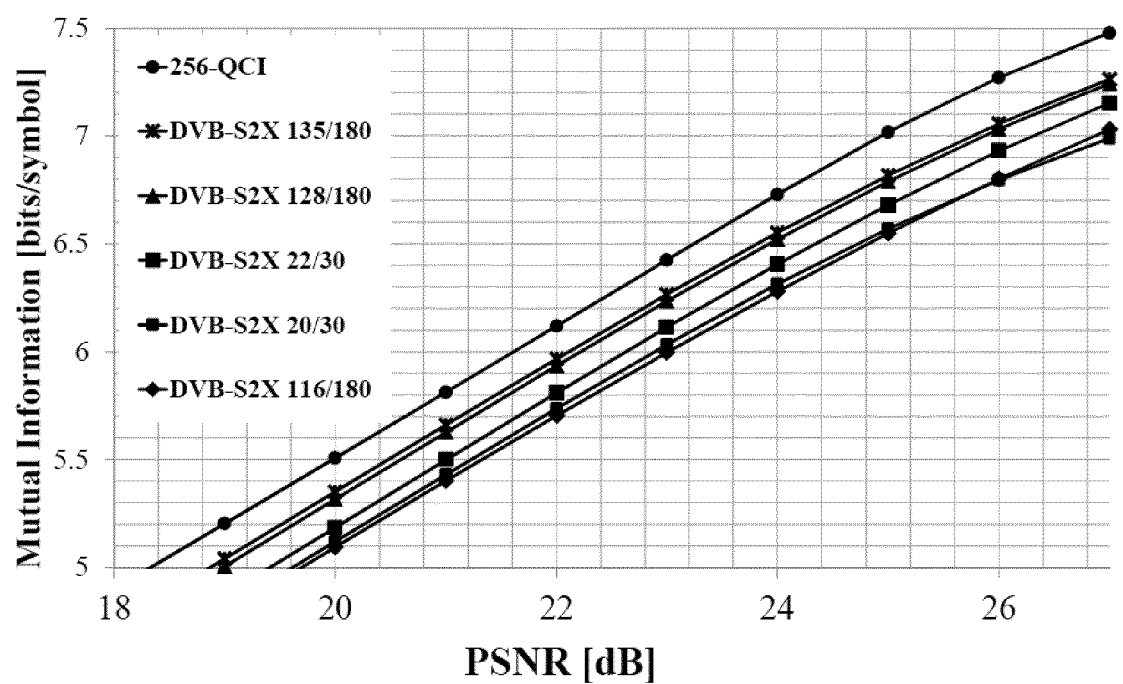
FIG. 6 illustrates the performance of the signal constellation shown in FIG. 5, as compared to state-of-the-art signal constellations.

In FIG. 6 the AMI of the 256-QCI is compared to five constellations of DVB-S2X. At one bit lower than the saturation point (i.e., spectral efficiency of 7 bits per transmitted symbol), QCI shows a gain of 0.7 dB with respect to the best constellation in DVB-S2X.

Figure 7:
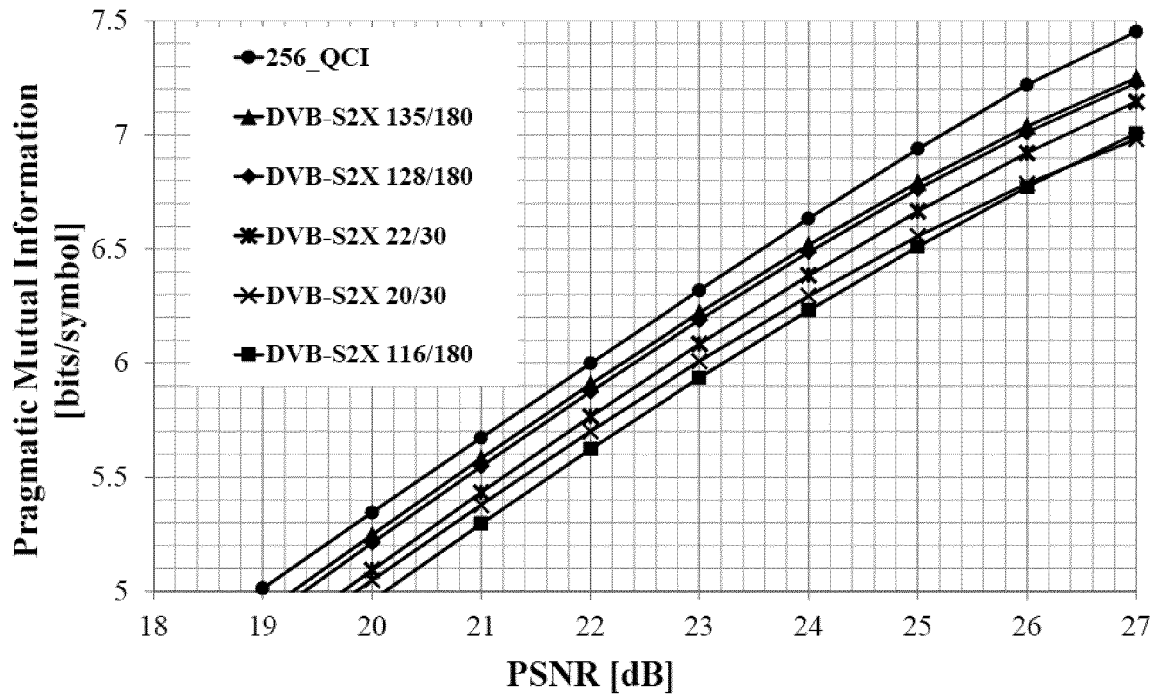
FIG. 7 illustrates the performance of the signal constellation shown in FIG. 5, as compared to state-of-the-art signal constellations.
Figure 8:
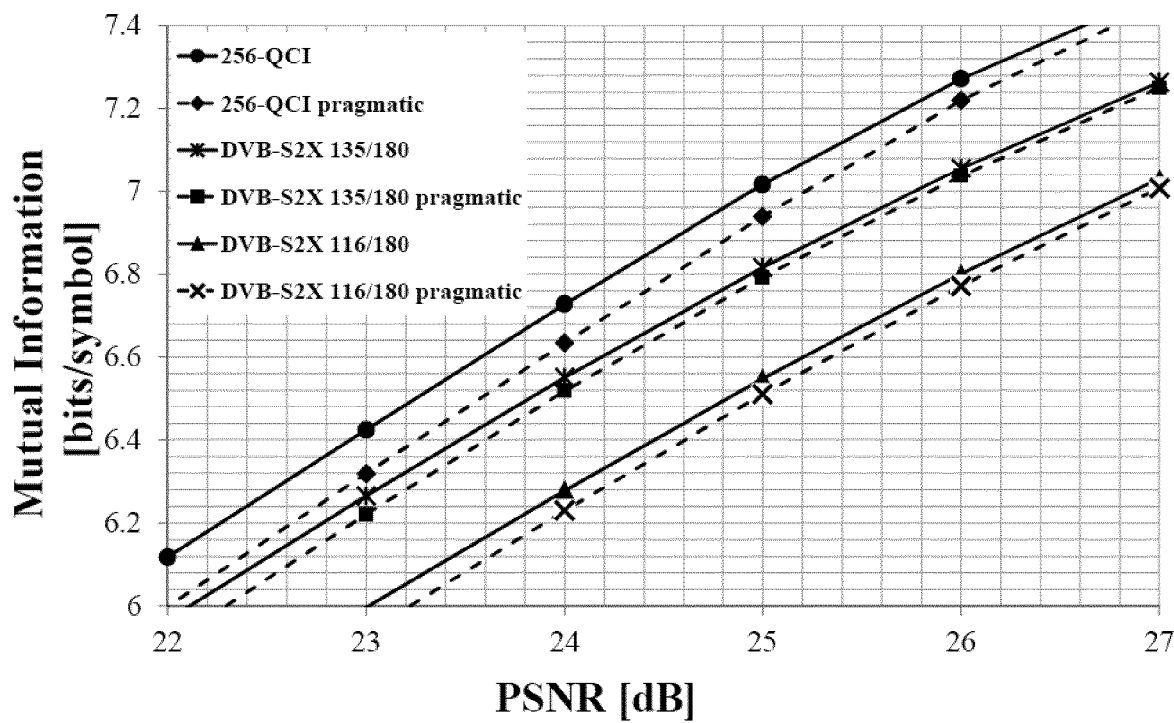
FIG. 8 illustrates the performance of the signal constellation shown in FIG. 5, as compared to state-of-the-art signal constellations.

Targeting lower spectral efficiency, the gain is around 0.5 dB. As for the PAMI values, see the plot of the curves in FIG. 7. In FIG. 8 both AMI and PAMI results are replotted for the 256-QCI, the best DVB-S2X constellation and the worst one for the most relevant range of spectral efficiencies.

Section IV: Some Characteristic Properties of QCI Constellations a. 1D Optimization of QCI As mentioned before, the QCI constellations in accordance with the present invention are not optimal and it is rather easy to find constellations with higher AMI or PAMI. In particular, initializing the simulated annealing algorithm by QCI and carefully choosing the cooling parameters, normally results in a constellation with slightly higher PAMI, in compromise, the inverse mapping to the QAM constellation will not be valid anymore, a characteristic which can be important in order to reduce the detection complexity.

Given the QAM structure and the characteristics of the function f, the nearby rings of QCI have the same distance from each other. One can however optimize the radii of the rings without departing from the scope of the present invention. This allows to further optimize the QCI constellations for a wide range of channel models and parameters, while preserving the 1D detection property.

Figure 9:
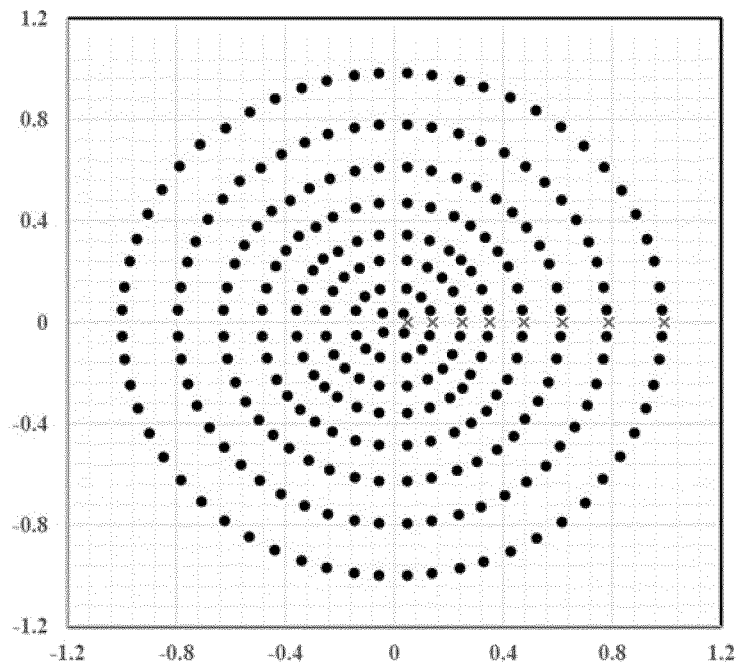
FIG. 9 illustrates a 256-ary signal constellation generated using a non-uniform 256QAM constellation as a product of two one-dimensional constellations with only 8 symbols each.

The radii optimization for M-QCI can be interpreted as a 1D constellation design with $2^{(m/2)-1}$ points (when m is even). For example, as for 256-QCI, one needs to find the placement of only 8 points over the x-axis with positive values which maximizes the AMI (PAMI) of resulting 256-QCI constellation with non-uniform distribution of the radii (see FIG. 9). Notice that the points over the outer circles tend to be more uniformly distributed in FIG. 9.

Simulated annealing can be used for the 1D constellation optimization problem. This algorithm can provide very competitive solutions for 1D constellation designs with up to 64 points, or more.

B. Low Complexity 1D Soft Detection by Inverse Mapping

One of the main drawbacks of employing large constellations known from the prior art is the receiver's (detector and decoder) high computational complexity. The log-likelihood ratios (LLR) need to be calculated at the detector and sent to the soft-decoder. As for the complexity of the decoder, some recent studies indicate that hard decoding of all bits except two or three bits in each dimension will not cause significant losses in the performance, see for example Kayhan et al., "Analog Digital Belief Propagation and its Application to Multi Stage Decoding Systems," 2015 IEEE International Black Sea Conference on Communications and Networking (BlackSeaCom), pp. 82-86, May 2015.

Figure 10:
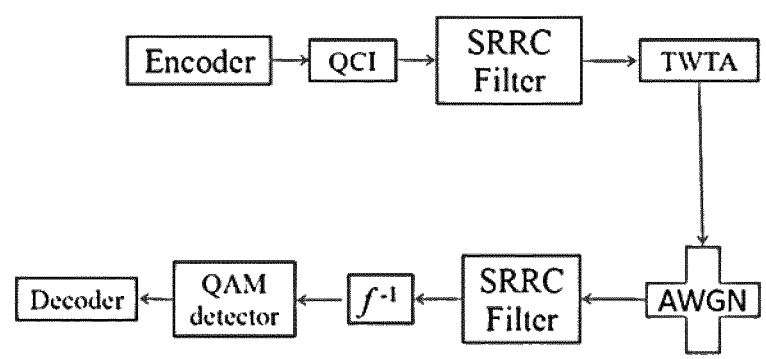
FIG. 10 shows a block diagram of a transmission and reception system in accordance with a preferred embodiment of the invention.

On the other hand, the complexity of the detector grows exponentially as a function of m (number of bits associated to each symbol). Therefore, having a low complexity soft detector is crucial when high order modulations are employed. Begin the Cartesian product of two 1D constellations, the complexity of the detector according to the present embodiment of the invention grows only polynomially with respect to m for QAM. For QCI constellations, a straightforward strategy for low complexity detection is first to compute $F^{-1}(y)$, and then calculating LLRs assuming a QAM constellation. A block diagram is shown in FIG. 10.

More elaborated techniques may be proposed for 1D soft detection of the QCI constellations. For example, techniques similar to those in Kim et al., "One-Dimensional Soft-Demapping Algorithms for Rotated QAM and Software Implementation on DSP," IEEE Transactions on Signal Processing, vol. 61, no. 15, pp. 3918-3930, Aug. 1, 2013, for computing the 1D soft demapping for rotated QAM constellations may be used with appropriate modifications.

Finally, notice that the radial map is not the only (up to scaling) isomorphism between squares and circles. Other isomorphisms may be considered that may map the QAM into a uniform APSK constellation or any other desired shapes. For all such constructions, an inverse mapping will provide a 1D detection, however the loss with respect to the optimal maximum likelihood detector may be large depending on the isomorphism. Moreover, it may be difficult to express such isomorphism in closed form analytically.

C. APSK Constellations Inspired by QCI

One of the main characteristic properties of known uniform APSK constellations is the fact that points over a concentric circle are uniformly distributed (in terms of the phases). QCI in accordance with embodiments of the present invention do not initially have this property by the way they are constructed. But one can further modify the position of the points to distribute them uniformly over each circle. For even values of m, this will result in construction of APSK constellations where the number of points on concentric circles form an arithmetic progression with common difference 8 and starting point 4. As for example, a 256-APSK constellation with the following distribution of points over each ring can be constructed: 4+12+20+28+36+44+52+60, starting from the innermost circle or ring and proceeding outwards. The radii can be optimized for the given channel and a natural Gray mapping corresponding to original QAM constellation can be used. This constellation has a slightly higher AMI and PAMI than 256-QCI, but inverse mapping to the QAM constellation is not straightforward anymore.

Similarly, one can construct 1024-APSK, 2048-APSK and 4096-APSK constellations. For odd values of m, a unique QAM does not exist. In this case, for m=7 we propose the 4+12+20+28+32+32-APSK constellation with optimized radii and phases. For m=9 we propose the constellations 4+12+20+28+36+44+52+60+64+64+64+64-APSK with optimized radii and phases over each circle.

It should be noted that features described for a specific embodiment described herein may be combined with the features of other embodiments unless the contrary is explicitly mentioned.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. A method for transmitting and receiving a digital data stream over a communication channel, wherein the method comprises the following steps:
   a) at a transmitting node, modulating the digital data stream onto a carrier wave to generate a modulated signal, the modulating including converting digital data in the digital data stream into symbols for transmission, the symbols being encoded into one of M possible symbols of an M-ary signal constellation, the symbols of said M-ary signal constellation being distributed on a plurality of concentric circles
   b) at the transmitting node, transmitting the modulated signal over said communication channel;
   c) at a receiving node, receiving said modulated signal;
   d) at the receiving node, detecting each symbol of said received modulated signal;
   characterized in that
      said M-ary signal constellation is such that there exists a corresponding M-ary quadrature amplitude modulation (QAM) signal constellation having an equal plurality of concentric squares, wherein a symbol of said M-ary signal constellation, distributed on a corresponding one of the plurality of concentric circles bijectively maps to a corresponding symbol of said corresponding M-ary QAM signal constellation distributed on a corresponding one of the plurality of concentric squares, and wherein
      said step of detecting each symbol comprises the step of
         i) detecting each symbol in the modulated signal using the characteristics of the corresponding M-ary QAM signal constellation.

2. The method of claim 1, wherein prior to step (i) the method comprises the step of using the inverse of said bijective map for mapping the received signal, which has been modulated using said M-ary signal constellation, to the corresponding QAM-modulated signal, and wherein at step (i), each symbol is detected in the corresponding QAM-modulated signal.

3. The method according to claim 1, wherein in said M-ary signal constellation, the number of symbols on concentric circles forms an arithmetic progression with common difference 8 and starting point 4 on the smallest circle, for $M=2^m$ and m even.

4. The method according to claim 1, wherein said M-ary signal constellation is a 4+12+20+28+32+32-APSK constellation for $M=2^m$ and m=7; and a 4+12+20+28+36+44+52+60+64+64+64+64-APSK constellation for m=9.

5. The method according to claim 1, wherein each one of the plurality of concentric circles of said M-ary signal constellation is the smallest covering circle covering the symbols located on the corresponding one of the plurality of concentric squares of the corresponding M-ary QAM signal constellation onto which the symbols of the M-ary signal constellation bijectively map.

6. The method according to claim 1, wherein said bijective mapping between the M-ary signal constellation and the corresponding M-ary QAM signal constellation preserves the relative distances between any two symbols in the M-ary signal constellation.

7. The method according to claim 1, wherein said M-ary signal constellation is a uniform APSK constellation, any two neighboring symbols on a given concentric circle having equal phase difference.

8. The method according to claim 1, wherein said M-ary signal constellation a is non-uniform APSK constellation.

9. The method according to claim 1, wherein the difference of the radii of any two neighboring concentric circles of said M-ary signal constellation are equal.

10. The method according to claim 1, wherein the difference of the radii of two neighboring concentric circles of said M-ary signal constellation depends on the two circles.

11. The method according to claim 1, wherein said M-ary signal constellation and said corresponding M-ary QAM signal constellation have a dimensionality that is higher than 2.

12. A method for transmitting a digital data stream over a communication channel at a transmitting node, wherein the method comprising the following steps:
  modulating the digital data stream onto a carrier wave to generate a modulated signal, the modulating including converting data in the digital data stream into symbols for transmission, the symbols being encoded into one of M possible symbols of an M-ary signal constellation, the symbols of said M-ary signal constellation being distributed on a plurality of concentric circles; and
  transmitting the modulated signal over said communication channel;
  characterized in that
  said M-ary signal constellation is such that there exists a corresponding M-ary quadrature amplitude modulation (QAM) signal constellation having an equal plurality of concentric squares, each square being circumscribed by a corresponding circle of the M-ary signal constellation, wherein the symbols of said M-ary signal constellation, distributed on a corresponding one of the plurality of concentric circles bijectively map to the corresponding symbols of said corresponding M-ary QAM signal constellation distributed on a corresponding one of the plurality of concentric squares, and wherein the mapping is such that a line passing through the center of said plurality of concentric circles and through a symbol of said M-ary signal constellation, distributed on a corresponding one of the plurality of concentric circles, also passes through the corresponding symbol of said corresponding M-ary QAM signal constellation, distributed on said corresponding one of the plurality of concentric squares.

13. A method for receiving a digital data stream over a communication channel at a receiving node, wherein the method comprises the following steps:
  receiving a modulated signal, wherein said signal has been modulated at a transmitting node using an M-ary signal constellation, the symbols of said M-ary signal constellation being distributed on a plurality of concentric circles;
  detecting each symbol of said received modulated signal;
  characterized in that
  said M-ary signal constellation is such that there exists a corresponding M-ary quadrature amplitude modulation (QAM) signal constellation having an equal plurality of concentric squares, wherein a symbol of said M-ary signal constellation, distributed on a corresponding one of the plurality of concentric circles bijectively maps to a corresponding symbol of said corresponding M-ary QAM signal constellation distributed on a corresponding one of the plurality of concentric squares, and wherein said step of detecting each symbol comprises the additional step of:
  i) detecting each symbol in the modulated signal using the characteristics of the corresponding M-ary QAM signal constellation.

14. A data transmission device comprising a modulator, a transmitter and at least one memory element, the device being configured for:
  the modulator modulating a digital data stream onto a carrier wave to generate a modulated signal, the modulator converting digital data in the digital data stream into symbols for transmission by the transmitter, the symbols being encoded into one of M possible symbols of an M-ary signal constellation, the symbols of said M-ary signal constellation being distributed on a plurality of concentric circles
  the transmitter transmitting the modulated signal over a communication channel, wherein said M-ary signal constellation is such that there exists a corresponding M-ary quadrature amplitude modulation (QAM) signal constellation having an equal plurality of concentric squares, each square being circumscribed by a corresponding circle of the M-ary signal constellation, wherein the symbols of said M-ary signal constellation, distributed on a corresponding one of the plurality of concentric circles bijectively map to the corresponding symbols of said corresponding M-ary QAM signal constellation distributed on a corresponding one of the plurality of concentric square, the mapping is such that a line passing through the center of said plurality of concentric circles and through a symbol of said M-ary signal constellation, distributed on a corresponding one of the plurality of concentric circles, also passes through the corresponding symbol of said corresponding M-ary QAM signal constellation, distributed on said corresponding one of the plurality of concentric squares.

15. A data reception device comprising a receiver, a detector and at least one memory element, the device being configured for:
  the receiver receiving a modulated signal, wherein said signal has been modulated at a transmitting node using an M-ary signal constellation, the symbols of said M-ary signal constellation being distributed on a plurality of concentric circles;
  the detector detecting each symbol of said received modulated signal;
  wherein said M-ary signal constellation is such that there exists a corresponding M-ary quadrature amplitude modulation (QAM) signal constellation having an equal plurality of concentric squares, wherein a symbol of said M-ary signal constellation, distributed on a corresponding one of the plurality of concentric circles bijectively maps to a corresponding symbol of said corresponding M-ary QAM signal constellation distributed on a corresponding one of the plurality of concentric squares, and wherein the detector is further configured for i) detecting each symbol in the modulated signal using the characteristics of the corresponding M-ary QAM signal constellation.

\* \* \* \* \*